No. 773,881. PATENTED NOV. 1, 1904.
M. MILCH.
COMMUTATOR.
APPLICATION FILED MAR. 19, 1904.
NO MODEL.

WITNESSES:

INVENTOR:
Maurice Milch.
by
Att'y.

No. 773,881.

Patented November 1, 1904.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

COMMUTATOR.

SPECIFICATION forming part of Letters Patent No. 773,881, dated November 1, 1904.

Application filed March 19, 1904. Serial No. 198,960. (No model.)

*To all whom it may concern:*

Be it known that I, MAURICE MILCH, a subject of the King of Austria-Hungary, residing at Schenectady, in the county of Schenectady and State of New York, have invented certain new and useful Improvements in Commutators, of which the following is a specification.

My invention relates to commutators for dynamo-electric machines, and in particular to commutators for alternating-current motors.

It is frequently desirable to provide the secondary winding of alternating-current motors with commutator and brushes for starting purposes, as in the case of a single-phase motor, to give the motor a starting torque, or in the case of polyphase motors to increase and control the starting torque, and then when the motor is up to speed to short-circuit the secondary winding so that the motor will operate as a simple induction-motor. This change when the motor is up to speed has been accomplished by shifting a short-circuiting device into engagement with the commutator-segments and by other similar arrangements.

The object of my invention is to provide a commutator which shall change its characteristics automatically without any shifting of the brushes or manipulation of any kind. This I accomplish by inserting between the commutator-segments a substance having a high-negative-resistance coefficient, or what may be called a "self-reducing" resistance, so that at starting the segments are practically insulated from each other, as in the ordinary commutator, while after the motor is up to speed and the resistance becomes heated the entire commutator will be practically short-circuited. Several substances are suitable for this purpose, and particularly iron tetroxid or magnetite.

Figure 1:
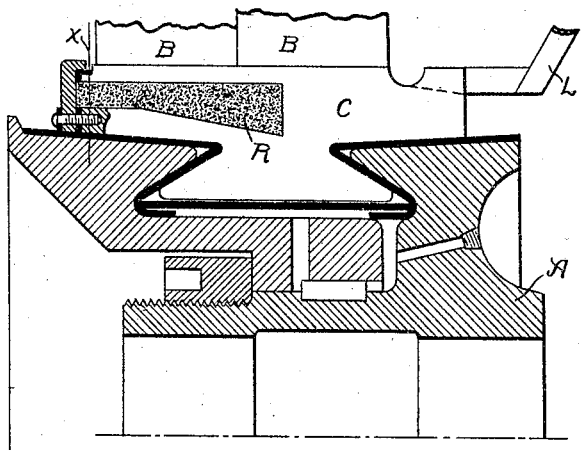
Figure 2:
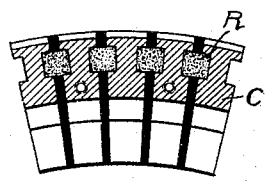
Figure 4:
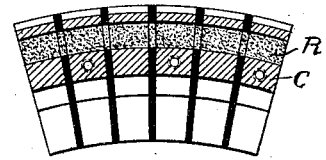
Figure 3:
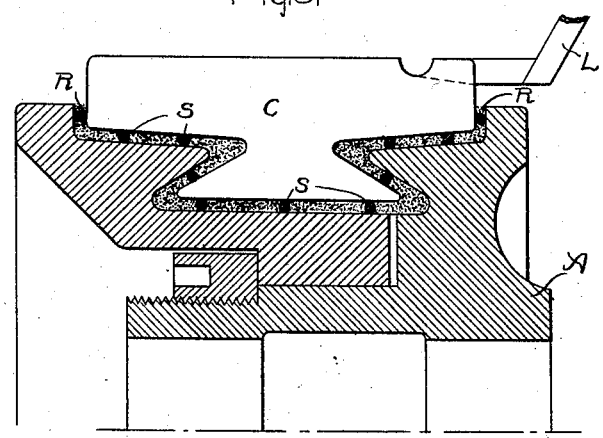

In the accompanying drawings, Figure 1 shows a cross-sectional view of a commutator arranged in accordance with my invention. Fig. 2 shows a cross-sectional end view of the same on the line $x$ in Fig. 1. Fig. 3 shows a modified form of my invention, and Fig. 4 shows a modification of the arrangement of Fig. 2.

In the drawings, C represents a commutator-segment secured to the frame A and insulated therefrom in the usual manner.

B B represent commutator-brushes, and L the lead from the segment to the secondary windings. (Not shown.)

R represents a self-reducing resistance, such as magnetite, inserted between adjacent commutator-segments, as shown in Fig. 2. The resistance R may be simply placed between the adjacent segments, taking the place of the usual mica insulation, or the segments may be slotted out, as shown in Fig. 2, in order to improve the mechanical construction. The slots for receiving the resistance may extend only partly through the segments, as shown in Fig. 2, or may extend entirely through the segments, as shown in Fig. 4, thus forming a continuous ring threading the commutator.

Fig. 3 shows an arrangement in which the commutator-segments are short-circuited through the frame A when the magnetite is heated. The magnetite in this case is substituted for the usual insulation between segments and frame, insulating rods or wires S being disposed at suitable points to give a rigid mechanical construction between the frame and the segments.

In all of the modifications shown the magnetite acts as a high resistance at starting, practically insulating each segment from the adjacent segments. As the motor speeds up and the magnetite heats up, however, the resistance falls to a small fraction of its original value, and all the segments are practically short-circuited on each other.

I have shown several modifications in which the resistance is inserted between segments in a variety of ways. It is evident that there are many other arrangements by which the segments may be connected through resistances having high-negative-resistance coefficients. Accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In a dynamo-electric machine, commutator-segments, and a material having a high-negative-resistance coefficient in electrical contact with adjacent segments.

2. In a dynamo-electric machine, commutator-segments, and magnetite in electrical contact with adjacent segments.

3. In a dynamo-electric machine, commutator-segments, and a self-reducing resistance in electrical connection with adjacent segments.

4. In a dynamo-electric machine, commutator-segments, and an electrically-continuous ring having a high-negative-resistance coefficient and in electrical contact with all of said segments.

5. In a dynamo-electric machine, commutator-segments, and an electrically-continuous ring of self-reducing resistance in electrical contact with all of said segments.

6. In a dynamo-electric machine, commutator-segments, and an electrically-continuous ring of magnetite in electrical contact with all of said segments.

In witness whereof I have hereunto set my hand this 18th day of March, 1904.

MAURICE MILCH.

Witnesses:
BENJAMIN B. HULL,
HELEN ORFORD.